United States Patent [19]
Fuchs

[11] Patent Number: 5,852,989
[45] Date of Patent: *Dec. 29, 1998

[54] METHOD FOR CONVEYING STANDING ANIMALS

[75] Inventor: Peter Fuchs, Adlikon, Switzerland

[73] Assignee: Peter Fuchs Technology Group AG, Adlikon, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 536,157

[22] Filed: Sep. 29, 1995

[30] Foreign Application Priority Data

Oct. 10, 1994 [CH] Switzerland ............... 03 040/94-7

[51] Int. Cl.⁶ .................. A01K 29/00; B65G 69/28; B65G 11/00
[52] U.S. Cl. .................................... 119/843; 119/847
[58] Field of Search ............... 119/843–849, 14.03, 119/14.04; 452/177–184

[56] References Cited

U.S. PATENT DOCUMENTS

| | | | |
|---|---|---|---|
| 2,269,012 | 3/1942 | Carli | 119/843 |
| 3,110,388 | 11/1963 | Elliott et al. | 119/845 |
| 3,460,515 | 8/1969 | Page et al. | 119/14.04 |
| 3,970,045 | 7/1976 | Graham, Jr. | 119/843 |
| 4,037,565 | 7/1977 | Ledwell, Jr. | 119/846 |
| 4,275,685 | 6/1981 | Hopkins | 119/843 |
| 4,850,308 | 7/1989 | Padgett | 119/845 |
| 5,023,974 | 6/1991 | Coles | 452/177 |
| 5,070,818 | 12/1991 | Gearn et al. | 119/845 |
| 5,112,270 | 5/1992 | Howard et al. | 452/66 |
| 5,592,902 | 1/1997 | Horton | 119/846 |

FOREIGN PATENT DOCUMENTS

| | | | |
|---|---|---|---|
| 35992/84 | 6/1985 | Australia. | |
| 255 261 | 2/1988 | European Pat. Off.. | |
| 422 312 | 4/1991 | European Pat. Off.. | |
| 2449402 | 4/1975 | Germany | 119/14.04 |
| 4029998 A1 | 5/1992 | Germany | 119/843 |
| 1459399 | 3/1974 | United Kingdom | 119/14.04 |

OTHER PUBLICATIONS

Grandin, T., *Double Rail Restrainer Conveyor for Livestock Handling,* J. Argic. Engng. Res., vol. 41, pp. 327–338 (1988).

Giger, W. Jr., et al, *Equipment for Low–Stress, Small Animal Slaughter,* Transactions of the ASAE, pp. 571–574 (1977).

Primary Examiner—John G. Weiss
Assistant Examiner—Ki Yong O
Attorney, Agent, or Firm—Walter C. Farley

[57] ABSTRACT

In a method for conveying live animals, a conveying channel having a dosing belt is moved in a conveying direction and side walls extending along the dosing belt separated by animal shoulder widths confine the animals. Standing animals are loaded onto the belt in a column with the head of each animal oriented in a desired direction relative to the conveying direction and with separation between the animals. Separating barriers transversely across the dosing belt are moved with the dosing belt and the animals to maintain separation between the animals. A chest belt can be employed to carry the animals, substantially fixing their positions.

10 Claims, 10 Drawing Sheets

METHOD FOR CONVEYING STANDING ANIMALS

FIELD OF THE INVENTION

This invention relates to a load conveying method and, more specifically, relates to a method for conveying live, standing animals.

BACKGROUND OF THE INVENTION

Mechanical conveyors with endless load surfaces are used for the most varied purposes and are inter alia used for column conveying of loads, such as the weight of animals and humans. Such conveyors can be in the form of chutes, roller conveyors and ski lifts.

Particularly for animal-correct or animal-appropriate conveying, Giger et al. have developed a sectional rail, in which calves and sheep are transported on a double rail (Transactions of the ASAE 1977, 20, 571). With that load conveying arrangement, the animals rest on the members of the double rail lying on their stomachs, have no ground or floor contact with their feet and are moved through the wall held by the conveying channel. This conveying position largely fixes the animals and conveying takes place with little stress. Therefore the conveyor is used in abattoirs for conveying animals to the slaughter bench.

A disadvantage of conveying by means of sectional double rails consists of the difficulty of the animals climbing onto the double rail. To eliminate this disadvantage, Grandin has made a further development, in which the animals climb onto the double rail by means of an assisting leg spreader (J. agric. Engng. Res 1988, 41, 327). This conveyor is not suitable for unaccompanied, automatic climbing on of the animals. It is, e.g., difficult to see how the animals can jump onto the leg spreader without assistance. It is difficult to see whether they have to be pushed or pulled for this purpose. A clear reference to difficulties being encountered when climbing on is given by the fact that jumping over the leg spreader is prevented by the incorporation of a downwardly sloping roof or cover above the spreader. Animals which jump up are deflected by the roof or cover. The need for such a restrictive aid produces stress and fear in the animals when this conveyor is used.

SUMMARY OF THE INVENTION

An object of the present invention is to provide conveying methods by means of an animal-correct and, in particular, stress and fear-free conveyor. The object of the invention is to in no way disturb the well-being of the animals when using the conveyor. By means of the conveyor the animal is to be brought into a largely fixed position. The invention also aims at permitting a largely automated operation, i.e. an operation without the manual supply of animals to the conveying means of the conveyor.

The idea on which the invention is based is the avoiding of causes of stress and fear in the animals to be conveyed. To avoid stress and fear, the conveying of the animals is adapted to their natural behavioral patters. In precisely the same way as, e.g., the width of load conveyor belts is matched to the size and behavioral pattern of the animals. The entrance and conveying of the animals by means of the conveyor takes place without any force and without the action of fear of stress-inducing supply aids. Various, modular joinable devices bring about a substantial fixing of the animals on the conveyor. The movement space of the animals therefore decreases sequentially from module to module. Undesired animal positions are automatically corrected. The conveying aids are constituted by stimulating elements such as deceptive mirrors or reflectors, massaging brushes and calming, acoustic signal generators.

In modular manner, the conveyor according to the invention comprises several devices, which can be summarized as follows:

a) A dosing device permits the entrance of individual animals onto a conveying dosing belt for column conveying. Conveying advantageously takes place in a metallized conveying channel having a width which is the same as the width of the animals' shoulders, so that independent turning around of the animals in the conveying channel is prevented. Through the deceptive action of the mirrors, the animals are calmed and relaxed. Swing-in running or movement barriers prevent forward and, in particular, return movement or running of the animals on the dosing belt in the conveying channel. The dosing device isolates the animals from one another and restricts their movement space.

b) A turning device permits automatic turning by 180° in the conveying channel of animals conveyed with incorrect orientations. After incorrectly oriented, conveyed animals are detected and, having been turned under the control of the turning means, can be returned to the channel. Curing turning, the animals are gently pushed by slight, animal-correct pulses from the rear and/or sides and the animals turn about their front legs.

c) A branching device permits bringing together or dividing up of the dosing belts. Different animal streams can be controlled by means of the branching devices. In this way, animal streams can be deflected to waiting belts, animal streams can overtake other, slowly-conveyed streams or those conveyed on slower dosing belts, etc.

d) A transfer device permits the climbing of the dosed conveyed animals onto foot belts and causes the animals to lie on a chest belt running between these foot belts. The foot belts and the chest belt consequently spread the animals apart. In the vicinity of the transfer point, both are running at the same conveying height with respect to the ground and, with increasing conveying height difference, the chest belt approaches the chest of the animal standing on the foot belts. At the end of the transfer device, in the vicinity of the delivery point, the animals are completely lying on the chest belt and lose their contact with the foot belts. The lying of the animals on the chest belt is supported by lateral brushes, which massage and therefore calm and relax the animals during the transfer.

e) The chest belt conveys the animals lying completely on their chests. The animals are held and guided by the conveying channel walls. This conveying position further restricts the movement space of the animals and the animals are now largely fixed.

The conveyor according to the invention can be used in many different ways. The animals fixed in this way on chest belts can be conveyed to weighing balances or cleaning stations, they can be conveyed for veterinary examinations or for injections, etc., but it is also possible to convey them to shearing stations in the case of sheep and to slaughter benches for animals to be slaughtered. Reference is made in this connection to the fact that the conveyor is combinable in preferred manner with the stunning device disclosed in European patent 422,312.

BRIEF DESCRIPTION OF THE DRAWINGS

The method and apparatus according to the invention are described in greater detail hereinafter with reference to the accompanying drawings, wherein.

DESCRIPTION OF THE PREFERRED EMBODIMENTS

Figure 1:
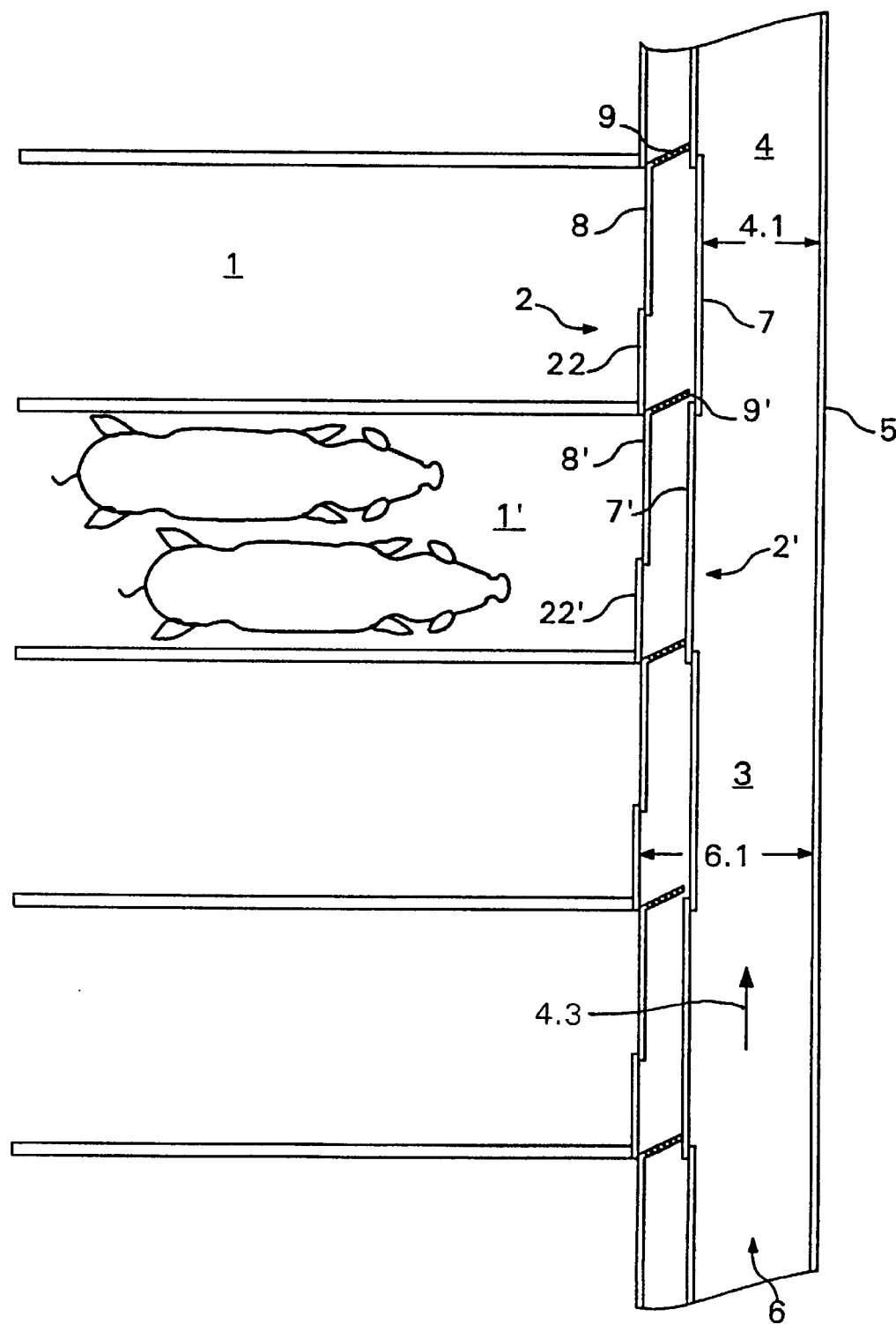
FIG. 1 is a plan view of part of a preferred embodiment of a conveyor according to the invention with pens or folds and closed entrance points on a dosing device.
Figure 2:
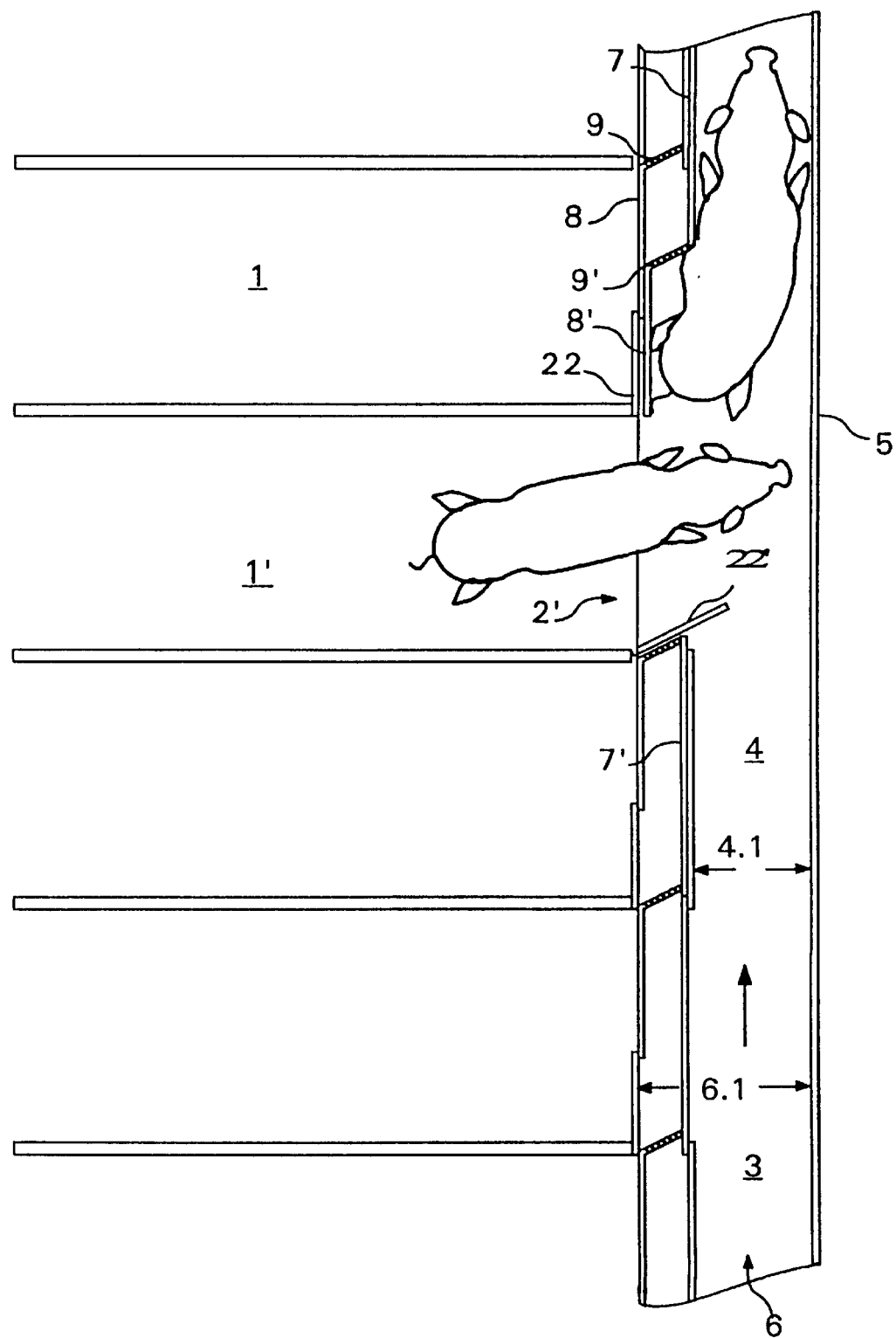
FIG. 2 is a plan view similar to FIG. 1 with opened entrance points from the pens of folds to the dosing device.

FIGS. 1 and 2 show a preferred embodiment of the conveyor with an entrance station, a dosing device and a dosing belt. The animals, e.g. pigs, are advantageously located in closable pens 1, 1' positioned perpendicular to a dosing device 3. By means of entrances, not shown, the animals have access to pens 1, 1' and by means of closable access point 2, 2' have access to a dosing belt 6 of dosing device 3. With the access to the access points 2, 2' open, the animals climb onto dosing belt 6 of the dosing device. The function of pens 1, 1' is to hold the animals prior to their climbing onto the dosing device. The pens are not essential for the method according to the invention, the method and the apparatus being able to function without such pens.

The dosing belt 6 is a commercial, motor-driven, unitary, endless roller conveyor belt, such as is used for conveying persons at airports. It can be made suitable for use in conveying animals by giving it a strengthened construction so as to provide protection against damage by hoofs. In order to fulfil the strict hygienic conditions applied in connection with keeping animals, the dosing device can be equipped with a washing installation, not shown. Advantageously, the dosing belt 6 has a width 6.1, which is wider than the conveying channel 4, which has a width 4.1. The conveying channel width 4.1 is animal-specific because, according to the invention, the animals are to be conveyed individually in column form held by the channel walls. Column conveying takes place in the conveying direction in the conveying channel 4, as is indicated by the conveying arrow 4.3. Dosing belt 6 e.g. moves forward at a speed of 4 m/sec in the conveying direction. Conveying channel 4 is as wide as the shoulders of the animals, which prevents any independent turning around of the animals or jamming of animals conveyed in a juxtaposed manner in the conveying channel. Typical widths of the conveying channel 4 for conveying pigs is 40 cm (pig shoulder width). The conveying channel 4 can be upwardly open and a typical height is 150 cm.

These dimensions can be adapted as a function of the animal type being conveyed. Moreover, with the knowledge of the present invention, the expert can vary these considerably when constructing such conveying channels.

In order to facilitate access of the animals to dosing belt 6, in the vicinity of the access points 2, 2' the animals have more movement space than in the conveying channel 4. The movement space or access space for the animals is such in the embodiment according to FIGS. 1 and 2 that access points 2, 2' have swinging doors 22, 22', sliding doors 8, 8' and sliding walls 7, 7', which can be swung and slid up, so that the access means can close and open pens 1, 1', and that the access means can open and close conveying channel 4 in the vicinity of access points 2, 2'. Swinging doors 22, 22' and sliding doors 8, 8' open and close pens 1, 1'. Sliding walls 7, 7' open and close the conveying channel 4 in the vicinity of access points 2, 2'. These access means 22, 22', 7, 7', 8, 8' of access points 2, 2', in the closed state, surround an access space which, in the opened state, gives the animals more movement space for climbing onto the dosing belt 6. This space is animal-specific and for pigs, in the preferred embodiment according to FIGS. 1 and 2, has the width 6.1 of the dosing belt 6 and a length of approximately one and a half pens 1, 1'. Advantageously, the access space is such that the animals, specifically as a function of animal size and pace length, after entering the access space, stand with at least one leg on the dosing belt 6, so that the lateral conveying starts in the conveying direction. However, the access space can also be larger or smaller, forming a pre-space between the pens and the dosing belt 6 (not shown embodiments). With the knowledge of the present invention the expert has numerous possibilities for implementing the access points.

The procedure for opening the access point 2' can be gathered from a comparison between FIG. 1 (closed pen 1') and FIG. 2 (open pen 1'). Firstly, the sliding wall 7' is moved towards the lower leaf edge (in the access space of the bottom-adjacent, closed pen), to widen the conveying channel 4 in the vicinity of the access point 2'. The sliding door 8' is then moved to the upper leaf edge (in the access space of the top-adjacent, closed pen 1) and then the swinging door 22' is swung up clockwise, to open pen 1' and create access space upstream of pens 1 and 1'. The animals now have access to dosing belt 6 of width 6.1. They are e.g. attracted onto dosing belt 6 by internally metallized channel wall 5. As soon as the animals are standing with one or more legs on the dosing belt 6, they are moved in the conveying direction. So that the animals have time and space to react to this conveying movement and climb completely onto the dosing belt 6, the access space of open pen 1' expands into the access space of the adjacent, closed pen 1 in the conveying direction. In order that the animals do not climb onto dosing belt 6 counter to the conveying direction, they have no access space in front of the adjacent pen counter to the conveying direction. The opened swinging door 22' prevents access counter to the conveying direction of dosing belt 6. In order that the animals are gently guided in animal-appropriate manner into conveying channel 4, the end of the sliding door 8' located in the conveying direction is equipped with a side wall, narrowing in a sloping manner to the width of channel 4 and provided with rolls 9'. This side wall narrowing in sloping manner to the width 4.1 of the conveying channel 4 reduces the movement space of the conveyed animals in the vicinity of access point 2' to the width of conveying channel 4. Rolls 9', rotatable about their longitudinal axes, ensure that if the animals strike against the rolls, they roll thereon and the animals are calmed due to the massaging, rolling action on their sides. The conveying of the animals is matched to the natural behavioral pattern thereof. The animals, e.g. pigs, are attracted onto the conveyor by mirrors or reflectors and are calmed by the massaging brushes. Therefore no force is involved in entering the conveyor and there is no need for active aids such as hitting with sticks. Moreover, compared with the movement space of the animals in the pen 1', the movement space of the animals in the conveying channel 4 is greatly restricted. This embodiment of access points 2, 2' on the conveyor can be implemented in metal and wood using known, proven means.

As soon as all the animals in pen 1' have climbed up onto dosing belt 6, access point 2' is closed. After swinging in swinging door 22' and sliding back sliding doors 8' and 7', the conveying channel 4 once again has conveying width in the vicinity of the access point 2' and pen 1' is closed. Animals in the adjacent pens can then be given access to the dosing belt 6. With the knowledge of the present invention numerous possibilities are available to the expert for the implementation and construction of such access means.

Figure 3:
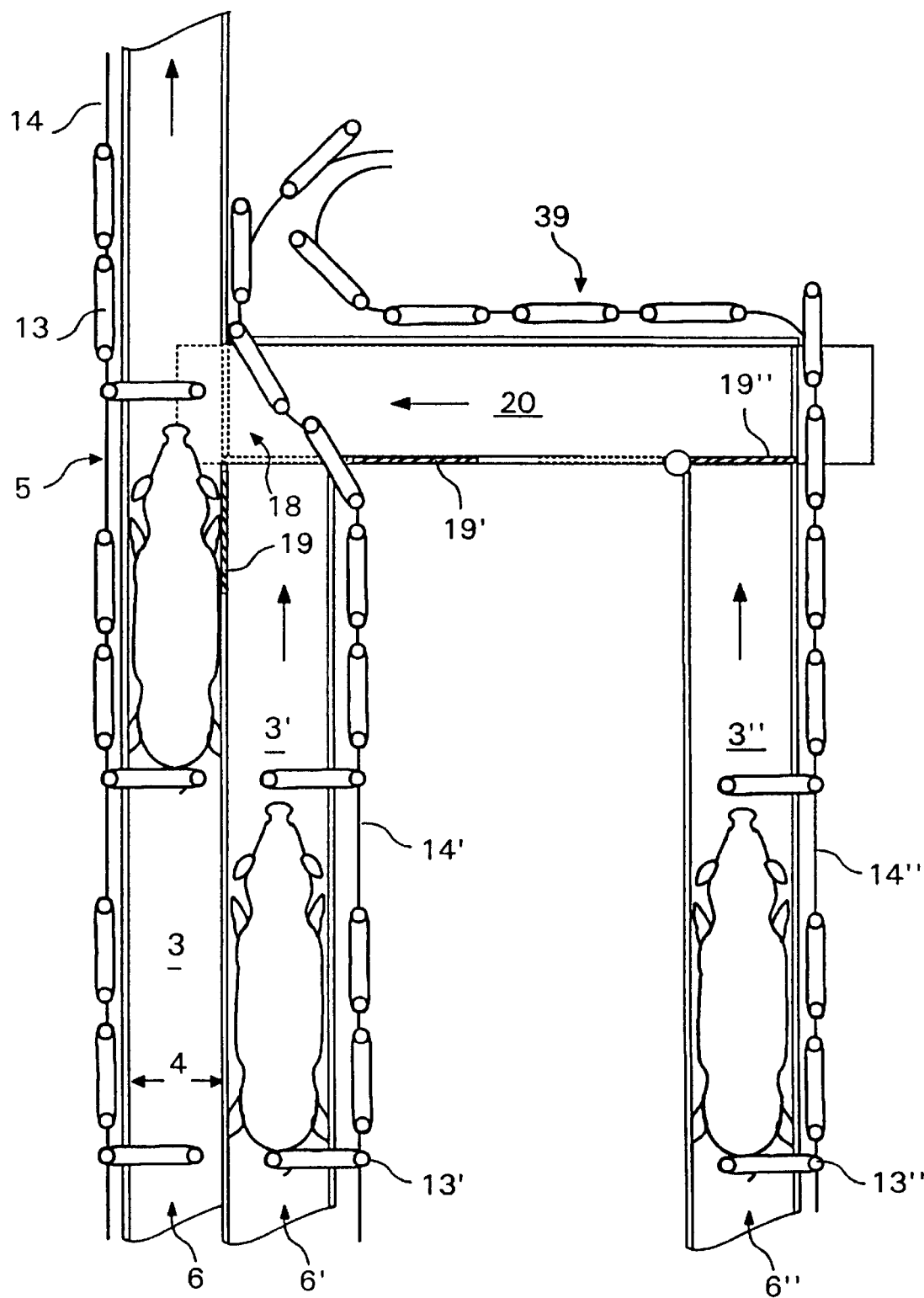
FIG. 3 is a plan view of part of a preferred embodiment of the dosing devices of the conveyor according to the invention where animals are conveyed in columns and part of a preferred embodiment of a branching device is shown.

FIG. 3 is another plan view of part of a preferred embodiment of dosing devices of the conveyor according to the invention, where animals are conveyed in columns and it shows part of a preferred embodiment of a branching device. Animals are individually conveyed in columns in dosing devices 3, 3', 3" are separated from one another on dosing belts 6, 6', 6" by separating means 39 in the form of running or movement barriers 13, 13', 13".

In this example, three dosing belts 6, 6', 6" are combined by a branching device 18. With sliders 19, 19', 19" of branching device 18 open, animals conveyed on secondary dosing belts 6', 6" climb via a connecting belt 20 onto main dosing belt 6. For space saving reasons, sliders 19, 19', 19" are moved into the channel wall 5 for opening purposes, so that they do not impede or disturb conveyed animals (the sliders 19 and 19' are slid in and the slider 19" out). By means of the branching device, the different animal streams of dosing belts 6, 6', 6" can be controlled. Naturally, sliders 19, 19', 19" can be slid in other planes, e.g. they can be removed and slid away from the belts. The control of this branching and bringing together advantageously takes place automatically from a remote location. For example, animal streams are pictorially determined by means of position determination means such as video cameras or structurally determined by means of ultrasonic and light detectors, followed by digitization and evaluation in a computer. The position of the animals upstream and downstream of branching device 18 is defined in this way. By timed (synchronized) opening and closing of the sliders 19, 19', 19" of branching device 18 and conveying with connecting belt 20, animal streams are combined. For safety reasons, the position determination means also determines whether the animals are "too long" on the connecting belt 20, i.e. whether possibly two animals have become jammed there or whether one animal is moving against the belt conveying direction and has consequently not been transferred. One or more sliders 19, 19', 19" can then be briefly closed, or connecting belt 20 can then be briefly stopped.

For branching and combining, animals conveyed on a dosing belt 6' or 6" at the end of the dosing belt climb up onto a connecting belt 20 at an angle to the conveying direction of dosing belts 6, 6', 6" and linking them. According to FIG. 3, the angle is 90°, but naturally also smaller angles can be used such as 45°. Connecting belt 20 advantageously conveys at the same speed as dosing belt 6, 6', 6" and conveys in the direction indicated by the conveying arrow. For safety reasons, so as to permit the animals to transfer in trouble-free, non-confusing manner between dosing belts 6, 6', 6" and connecting belt 20, belt 20 falls away in the conveying direction with a slight height difference of e.g. 1 to 5 cm. Connecting belt 20 is moved in transition-free manner up to main dosing belt 6, which is guided with the above-mentioned, slight height difference below the main dosing belt 6 and is only then turned there. In place of the embodiment of a unitary, linearly conveying connecting belt 20 shown in FIG. 3, it is also possible to use a connecting belt formed from members moving into and acting in one another. This embodiment is not shown. It is also possible to have only two dosing belts or more than three dosing belts can be combined. Numerous possibilities are open to the expert with the knowledge of the present invention.

Thus, animal streams can be combined in the method according to the invention and can also be separated. For example, one of the dosing belts 6' or 6" can convey animals more slowly and in a temporarily stationary manner on waiting belts. For example, one dosing belt 6' or 6" can be longer than the dosing belt 6, so that for the same conveying speed of the belts 6, 6' or 6", the animal streams of the belt 6 spatially overtake those of the belt 6' or 6". Naturally, such branching can be used in the opposite conveying direction compared with FIG. 3. In such a (not shown) embodiment, the animal streams are then divided up. Finally, such branching devices can be combined, so that in the method according to the invention with said apparatus a complete control of the animal streams is obtained. Here again, with the knowledge of the invention, numerous possibilities are available to the expert for implementing such branching devices.

Separating means 39 in the form of movement barriers 13, 13', 13" are used for limiting the relative movements of animals on the dosing belt 6, 6', 6". They are moved by continuously running movement barrier belts, 14, 14', 14" moving at the same speed as dosing belts 6, 6', 6" and in the same conveying direction. As soon as movement barriers 13, 13', 13" are guided into conveying channel 4, they advantageously swing automatically in behind and in front of the animals. Only certain barriers swing in. This can be structurally determined by position determination means such as video cameras or by ultrasonic and light detectors, then digitized and automatically controlled in accordance with a specific algorithm by a computer. If there is an animal in conveying channel 4, at the animal's position the movement barriers 13, 13', 13" do not swing in. In addition, when passing over connecting belt 20, barriers 13', 13" can be swung in in such a way that they do not disturb or impede animals conveyed on belt 20. For more details in this connection, refer to the raising of the vertical tube 26 in FIG. 8a, and reference is made to the description of an advantageous embodiment of a movement barrier and a movement barrier belt according to FIG. 8. Movement barriers 13, 13', 13" on movement barrier belts 14, 14', 14" have a higher density than the animals to be conveyed on the dosing belts 6, 6', 6". According to FIG. 3, for each animal length there are approximately three barriers 13, 13', 13". Compared with the movement space of the animals after entering the conveying channel 4 according to FIG. 2, the swinging in of barriers 13, 13', 13" taking place after entry of the animals causes further restriction of the movement space taking place to the animal length when conveying with the conveyor according to the invention. Without such movement barriers 13, 13', 13", which can be swung in to the animal length, the animals would move backwards and forwards on dosing belts 6, 6', 6" or would stand still and would, e.g., cause accumulations or blockages and impede the operation of the conveyor. Barriers 13, 13', 13" prevent movement forwards, but especially backwards of the animals on dosing belts 6, 6', 6". The dosing device isolates the animals from one another and restricts their movements on the one hand by the width of the conveying channel 4 and on the other by the movement barriers.

FIGS. 4a to 4f show in a plan view part of a preferred embodiment of a turning device of the conveyor according to the invention, where a standing conveyed animal is turned by 180°. The task of the turning device is to automatically detect and turn animals conveyed in standing manner in the conveying channel 4. Such a turning device is necessary for aligned conveying according to the invention. As a function of the purpose of the animal conveying, it is appropriate (e.g., for animals on the way to the slaughter bench) for all the animals to arrive at the end of the conveyor oriented either head toward the conveying direction or, alternatively, with the head away from the conveying direction. Animals not having the desired orientation (e.g., because they have climbed onto the dosing belt the wrong way around) are turned by the turning device.

Figure 4A:
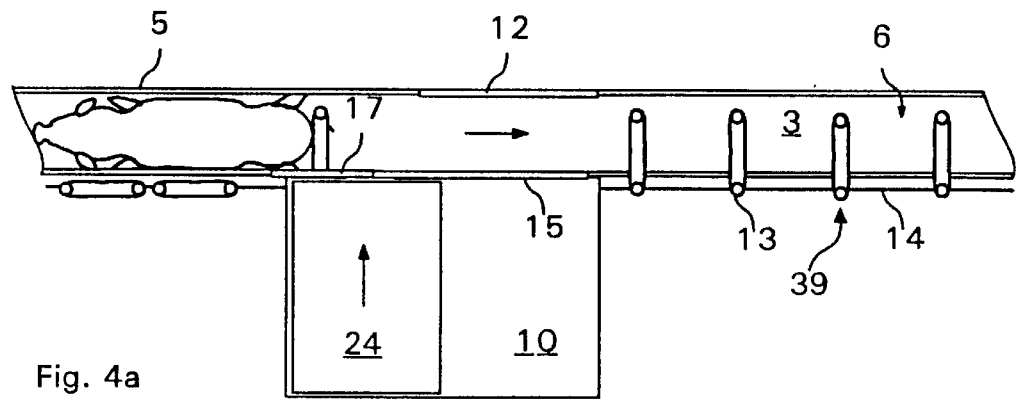
FIGS. 4a through 4f are plan views of a preferred embodiment of a turning device of the conveyor according to the invention where an animal, conveyed standing, is turned by 180°.
Figure 4B:
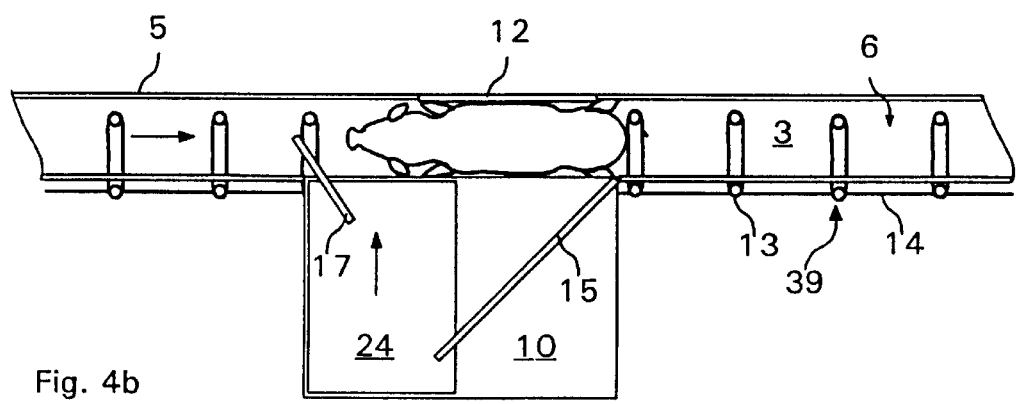
Figure 4C:
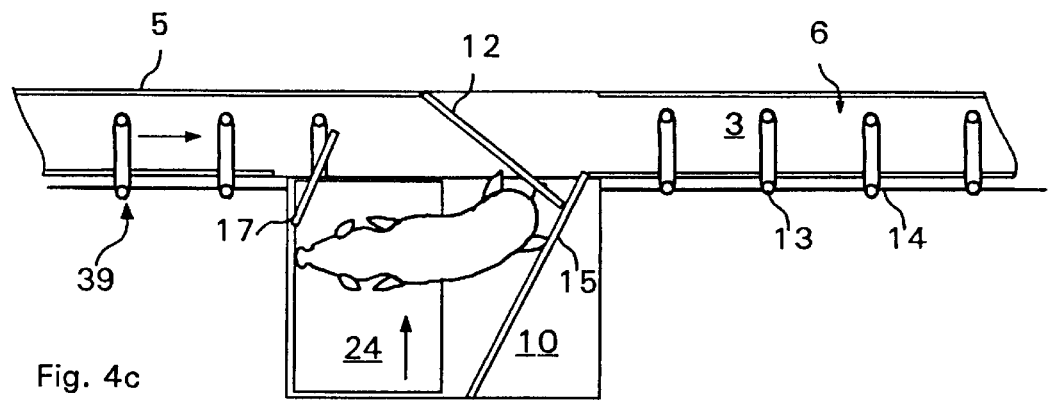
Figure 4D:
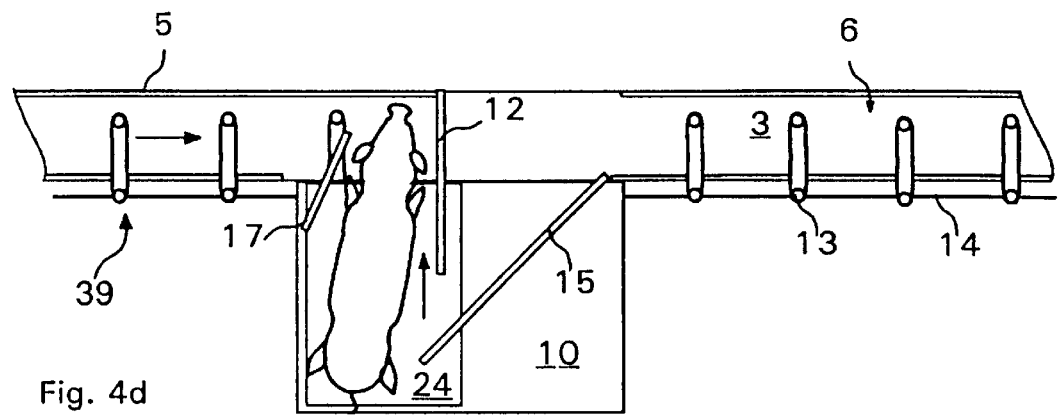
Figure 4E:
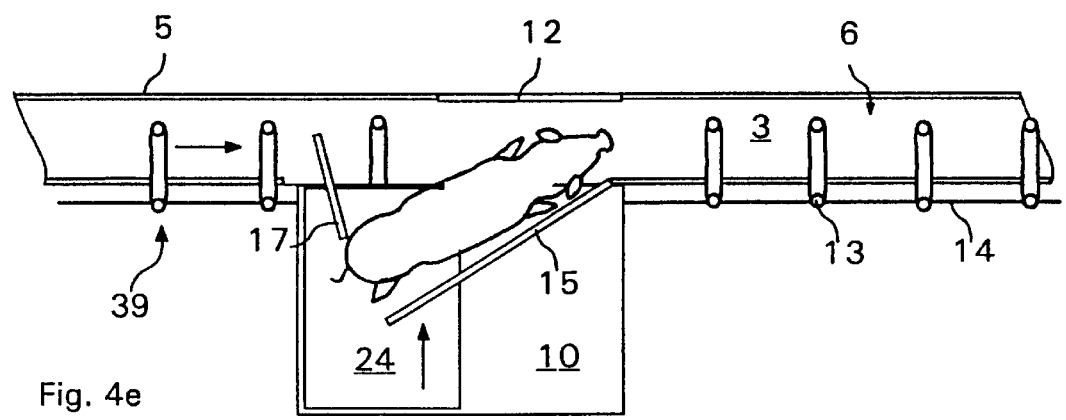
Figure 4F:
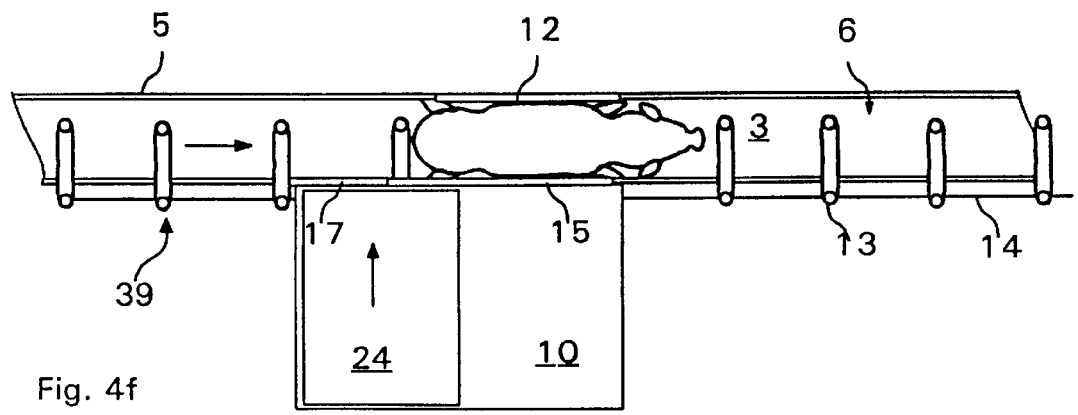

For turning purposes, the animal streams are pictorially detected by means of position determination means such as video cameras, or are structurally detected by means of ultrasonic and light detectors and images thereof are automatically digitized and evaluated in a computer. Thus, the position and conveying orientation of an animal conveyed in the conveying channel 4 is automatically determined (FIG. 4a) and a desired turning process is automatically initiated at the time when an animal conveyed the wrong way around is in front of the turning device (FIG. 4b). This can take place according to a specific algorithm. The synchronized, time-matched operation of the turning means 12, 15 and 17 takes place here. In the preferred embodiment, in timed manner a first swinging wall 15 is opened and a rotary wall 17 turned, which permits access for the animal to a turning space 10 of the turning device. Then a second swinging wall 12 is swung out, which pushes the animal by lateral pulses and/or pulses from the rear out of the conveying channel 4 (FIG. 4c). The animals, e.g. pigs, offer little or not resistance to such slight pulses from the side or rear. From this second swinging wall or pulse generator 12 the animal passes, in animal-correct manner, from the dosing belt 6 into the turning space 10 and turns about its front legs. The movement space of the animal is limited by the turning space walls, the rotary wall 7 and the first swinging wall 15. In accordance with its natural behavioral pattern, the animal evades these boundaries and turns when being moved forward about its front legs and with the head towards the conveyor 3. In order to assist this turning movement in the turning space 10 there is a conveyor belt 24, which conveys in the conveying direction indicated by the arrow. The conveyor belt 24 takes up roughly half the turning space 10 and works in a similar manner to the dosing belt 6. Advantageously, it is so fitted in the turning space 10 that when the animal enters the turning space it climbs onto the conveyor belt 24, which then conveys the animal in the conveying direction. In FIG. 4d, the animal has turned by approximately 90° and now has its head toward the conveying direction of the conveyor belt 24. The movement space of the animal is limited by the turning space walls, rotary wall 17 and second swinging wall 12. Second swinging wall 12 is moved back and the animal now runs into the space opening up in front of him and once again turns during movement about its front legs with the head towards conveyor 3 (FIG. 4e). Here again, rotary wall 17 and first swinging wall 15 apply slight pulses from the rear and/or side to the animal, to which the animal offers little or not resistance, so that it is moved by first swinging wall 15 and rotary wall 17 in animal-correct manner, head first out of the turning space 10 onto the dosing belt 6, and advances up to the next latched-in movement barrier 13 (FIG. 4f).

This turning process illustrated in the sequences of FIGS. 4a to 4g takes place rapidly. Within approximately 2 sec the animal conveyed 180° the wrong way around, is turned. The process is based on the natural behavioral pattern of animals and the turning is animal-appropriate. The animal is guided and deflected by swinging walls 12, 15 and rotary wall 17. This turning is initiated by slight pulses from the side and/or rear (where the animal is unstable) and it then turns about its front legs. It is also possible to perform this turning process with a dosing belt 6 conveying in the opposite conveying direction, where the conveying belt 6 conveys the animal standing the wrong way around thereon in the opposite conveying direction to the conveying arrow in FIGS. 4a to 4f. Unlike in the position shown in FIGS. 4a to 4f, the animal is then turned by slight lateral pulses and/or pulses from the rear with its hind legs first on conveyor belt 24 and turns about its front legs in the conveying direction thereof.

This variant of the turning process according to FIGS. 4a to 4g can be modified with the knowledge of the invention. Thus, e.g., an animal conveyed standing can be turned by 180° and, instead of being returned to the same or original dosing belt as in the variant according to FIGS. 4a to 4g, can be passed to a further dosing belt. Such a further dosing belt can, e.g., run and convey at a random angle or also at a right angle to the original or first dosing belt. The first dosing belt can be dosing belt 6 according to FIG. 4b and the further dosing belt conveyor belt 24 of the turning space 10 in FIG. 4b. According to FIG. 4c, the animal, as a result of slight lateral pulses and/or pulses from the rear has its front legs first on conveyor belt 24 and turns about these in the conveying direction thereof. Compared with the animal position on dosing belt 6 according to FIG. 4b, according to FIG. 4d the animal stands on the conveyor belt 24 turned by 180°. If the turning space 10 and conveyor belt 24 are now "lengthened" in the conveying direction of the latter, then the animal is no longer returned to the dosing belt 6 and does not stand in front of the conveying channel wall and instead remains on the "lengthened" conveyor belt 24 and is conveyed there turned by 180°. Thus, the aforementioned turning process is implemented by a change of the conveying dosing belt. This turning process can also take place in the opposite conveying direction of the dosing belt 6 where, compared with the conveying arrow according to FIGS. 4a to 4d, the animal is conveyed in the opposite direction. Then, as a difference compared therewith, the animal is turned by slight lateral pulses and/or pulses from the rear with its hind legs first on conveyor belt 24 and turns about its front legs in the conveying direction thereof.

FIGS. 5a to 5f and 6a to 6d show in side views and front views respectively, preferred embodiments of a transfer device of the conveyor according to the invention, where an animal conveyed standing on a dosing belt 6 is placed on a chest belt 16.

Figure 5A:
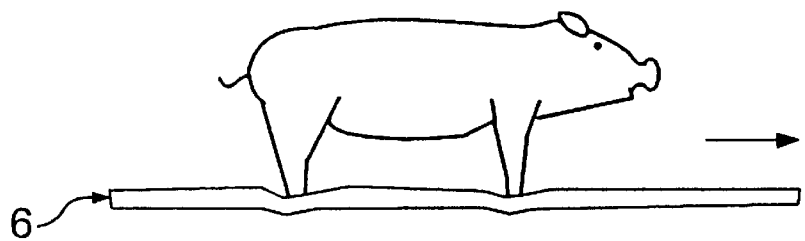
FIGS. 5a through 5f are side elevations of two preferred embodiments of a transfer device of the conveyor according to the invention where an animal, conveyed standing on a dosing belt, is placed on a chest belt.
Figure 5B:
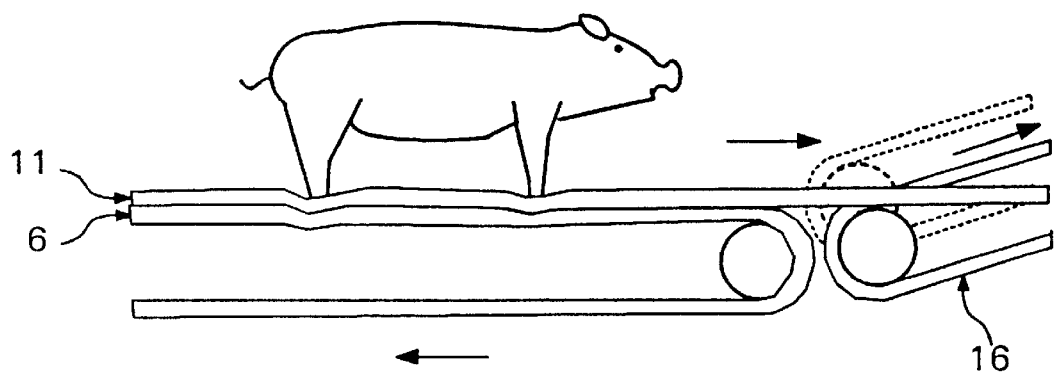
Figure 5C:
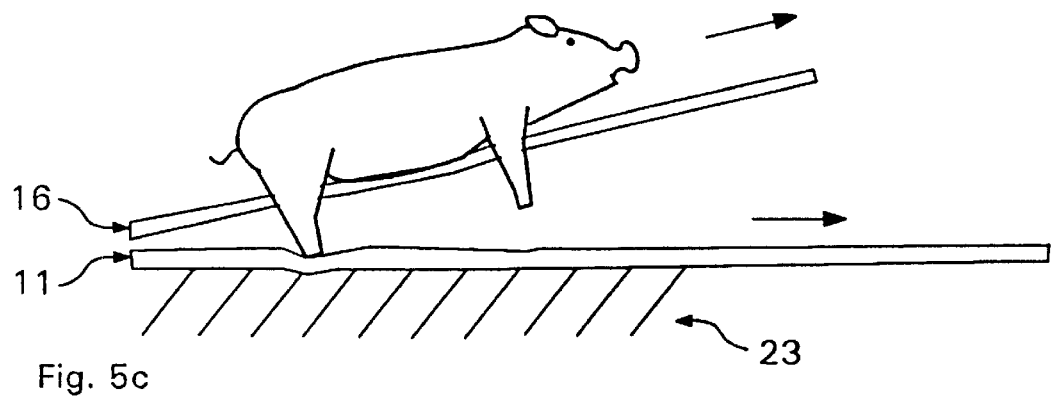
Figure 5D:
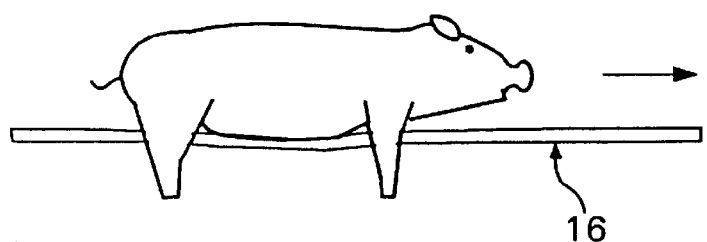
Figure 6A:
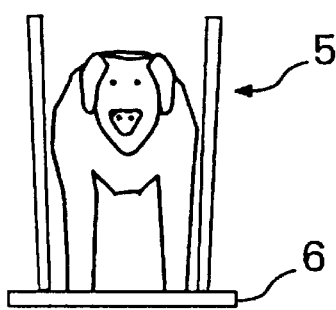
FIGS. 6a through 6d are end elevations of a preferred embodiment of a transfer device of the conveyor according to the invention where an animal, conveyed standing on a dosing belt, is placed on a chest belt.
Figure 6B:
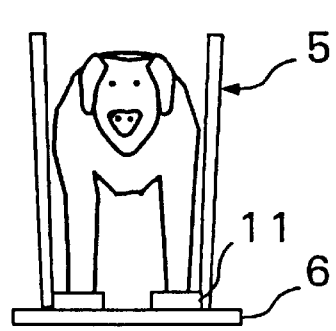
Figure 6C:
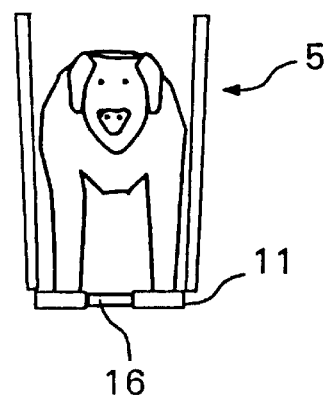

The transfer device transfers the conveyed animals between a shoulder-wide dosing belt 6 and a chest-wide chest belt 16. This takes place so that, in a first step, two parallel running foot belts 11 are superimposed on dosing belt 6. Foot belts 11 are narrower than dosing belt 6 and, e.g., at a first transfer point for the animals to be conveyed, rest in the form of an endless belt directly on an also endless dosing belt 6. Thus, dosing belt 6 and foot belts 11 run at the same height with respect to the floor or ground, at the same conveying speed and in the same conveying direction. The animals climb at the first transfer point from a dosing belt 6 (FIGS. 5a and 6a) onto a dosing belt 6 on which rest two foot belts 11 (FIGS. 5b and 6b). The thus conveyed animals have their feet on the foot belts 11. Advantageously, the foot belts are separated from one another by a chest belt width. In a further step, dosing belt 6 is removed and replaced by a chest belt 16 running parallel to and between the two foot belts 11. Advantageously, dosing belt 6 is removed from foot belts 11, in that at a second transfer point it is conveyed away as an endless belt on a reverse roller at an angle of 180°. Chest belt 16 is, e.g., supplied at the second transfer point as an endless belt by means of a further roller at an angle to foot belts 11 (FIG. 5c). Chest belt 16 is roughly as wide as the spacing of the two foot belts 11 and runs between the foot belts. For conveying pigs, the foot belts and chest belt are typically 15 cm wide each. Foot belts 11 and chest belt 16 have an angled arrangement to one another. At the second transfer point the chest belt 16 is conveyed up to the chest of the animal conveyed standing on foot belts 11. According to the embodiment of FIGS. 5b and 5c, coming from below and running between foot belts 11, chest belt 16 rises up to the chest of the animals at an angle. In this way the chest belt 16 approaches the animal's chest by the spacing of the leg length. Foot belts 11 and chest belt 16 convey in a spreading apart movement, e.g. in the vicinity of the second transfer point they have the same conveying height with respect to the ground, but with increasing conveying path have an ever greater conveying height difference. For animal-specific adaptation to the leg height of the conveyed animals, the height of the rotation point of the reverse roller of chest belt 6 at the second transfer point can undergo positional variation with respect to that of the reverse roller of dosing belt 6. This is shown in FIG. 5b, where another chest belt is shown in broken line form and which has a reverse roller mounted higher relative to the conveying plane of belt 6. Thus, the transfer can be rendered animal-specific. The chest belt 16 advantageously conveys away from the ground and with increasing conveying height difference approaches the chest of the animal standing on foot belts 11. For assisting the transfer, a floor support 23 is made lowerable at the second transfer point (e.g. constructed like a damped support). At the transfer point, floor support 23 gives way by several cm in the direction of the floor following the detection of animals in automatically controlled devices (actively) or passively gives way under the weight of the conveyed animals. this floor support 23 is shown in hatched form in FIG. 5c. As a result of this lowering by several cm, the chest of the animal approaches the chest belt 16. For calming the animals in this area, laterally massaging brushes are mounted, which massage in a calming manner the animals during this lowering. Advantageously foot belts 11, for assisting the climbing of the animals on to the chest belt 16, slightly fall away towards the ground or floor following the transfer point.

Figure 5E:
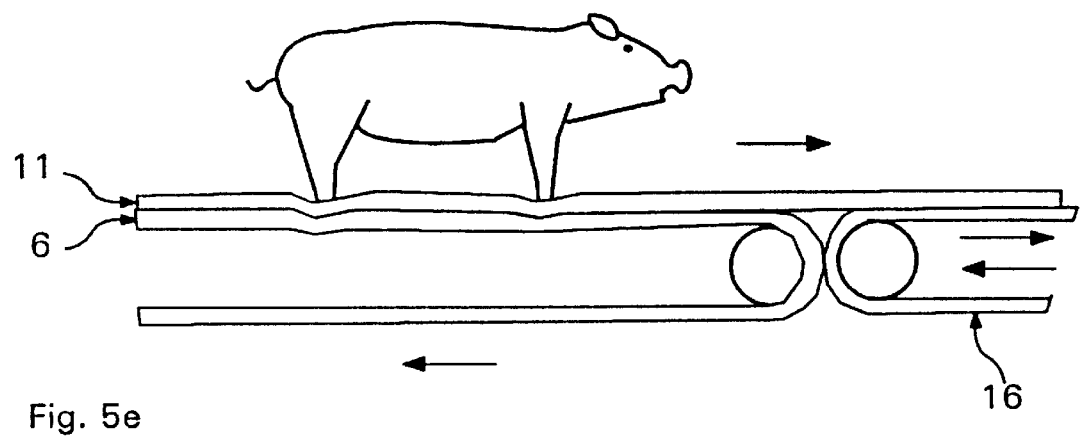
Figure 5F:
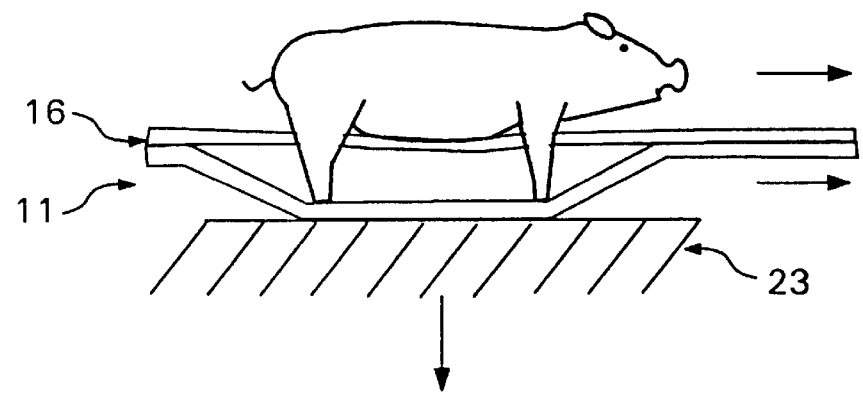

In another embodiment shown in FIGS. 5e and 5f, following the transfer point, chest belt 16 continues at the same height as foot belts 11 and advantageously, is only turned together with belts 11 at the reverse roller (FIG. 5e). For transfer purposes, floor support 23 is lowerable at the second transfer point, e.g., constructed like a damped support, which gives way under foot belts 11. At the transfer point, following the detection of animals, floor support 23 gives way in an automatically controlled manner (actively), or passively under the weight of the conveyed animals, by several cm in the floor direction. Foot belts 11 can be stretched. For such transfers numerous possibilities are available to the expert with the knowledge of the invention.

Figure 6D:
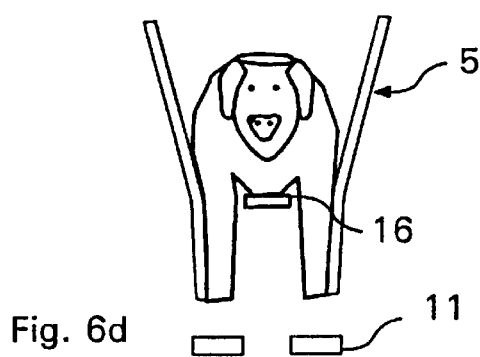

At the end of the transfer device in the vicinity of the delivery point, the animals are entirely located on chest belt 16 and lose contact with foot belts 11 (FIGS. 5c and 6d). The lying of the animals on the chest belt is assisted by brushes introduced laterally into the channel wall, which massage the animals on transfer, which has a calming and relaxing effect. Chest belt 16 conveys the animals, which are now lying entirely on their chests, advantageously in a horizontal position with respect to a conveying plane (parallel to the floor), the animals being guided in a holding manner by the conveying channel walls 5. Compared with the standing conveying position, this lying conveying position further restricts the movement space of the animals, which are now largely fixed.

The conveying channel can be open to the top, or half or completely closed. It is also possible to illuminate it by lamps, e.g. in an indirect manner. This embodiment is advantageous, because the conveying channel walls 5 can be entirely or partly lined with mirrors or reflectors, so that the conveyed animals can see into the same. Particularly with sloping conveying channel walls 5 according to FIG. 6d, in this way the conveying channel can be prismatically lined with mirrors, so that the individual animals conveyed in the column have the feeling of still being in a pen with other animals. As a result of this mirror deception, the animals are calm and relaxed.

Figure 7A:
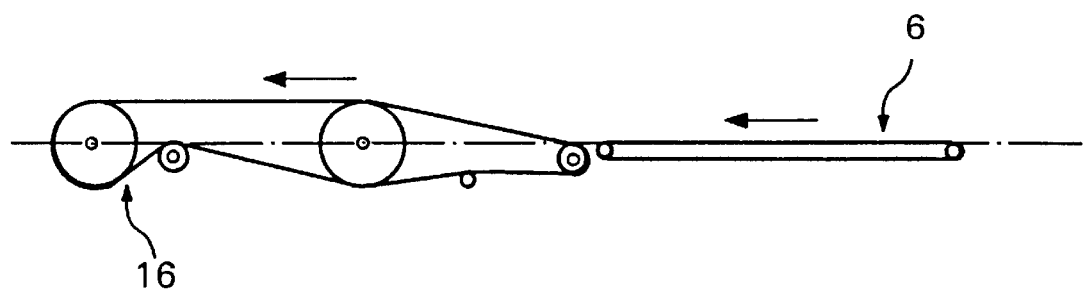
FIGS. 7a through 7c are schematic side elevations of a preferred embodiment of a transfer device of the conveyor according to the invention with dosing belt, foot belts and chest belt.
Figure 7B:
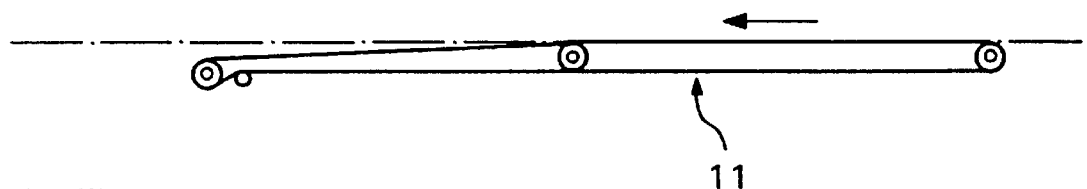
Figure 7C:
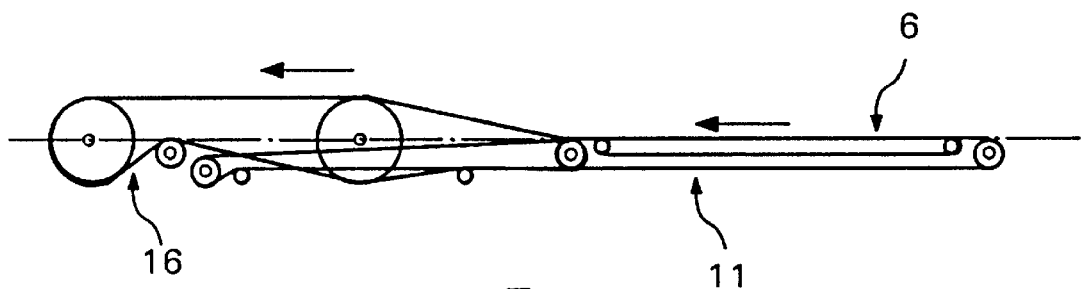

FIGS. 7a to 7c diagrammatically show in a side view part of a preferred embodiment of a transfer device of the conveyor according to the invention with dosing belt, foot belts and chest belt. These views show the conveyor and the interaction of the conveying means with respect to a broken line conveying plane parallel to the floor.

FIG. 7a shows the spatial arrangement and conveying direction of dosing belt 6 and chest belt 16. FIG. 7b shows the spatial arrangement and conveying direction of foot belts 11. FIG. 7c shows foot belts 11 superimposed on dosing belt 6, and chest belt 16 according to FIGS. 7a and 7b. FIG. 7a shows how the conveying height of the animals, while raising chest belt 16, remains largely constant with respect to the conveying plane, the height difference taking account of the leg height of the animals and is animal-specific. FIG. 7b shows how foot belts 11, following transfer, pass away at a slight angle from the conveying belt and the chest belt 16 in order to facilitate raising the animals onto the latter. FIG. 7c shows how the different belts cooperate and how they are turned by means of rollers of different sizes. This differently oriented conveying of the belts with respect to the conveying plane is brought about by differently dimensioned rollers, on which the belts rest, are guided and turned. Numerous implementation possibilities are available with the knowledge of the invention.

Figure 8B:
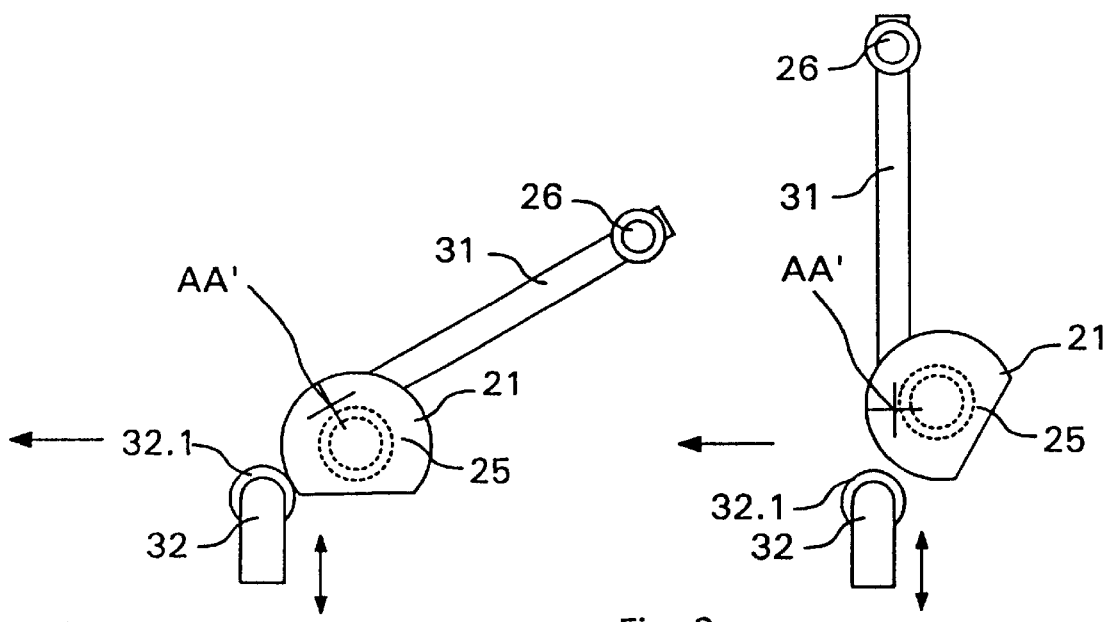
FIGS. 8a through 8c are side elevation, in section, and two plan views of a preferred embodiment of a movement barrier and movement barrier belt.
Figure 8C:
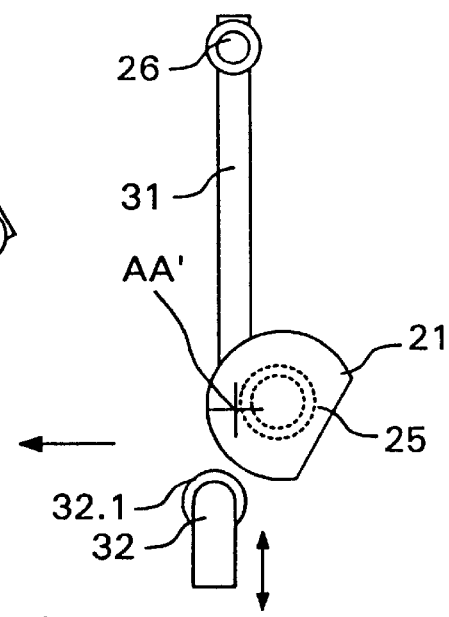
Figure 8A:
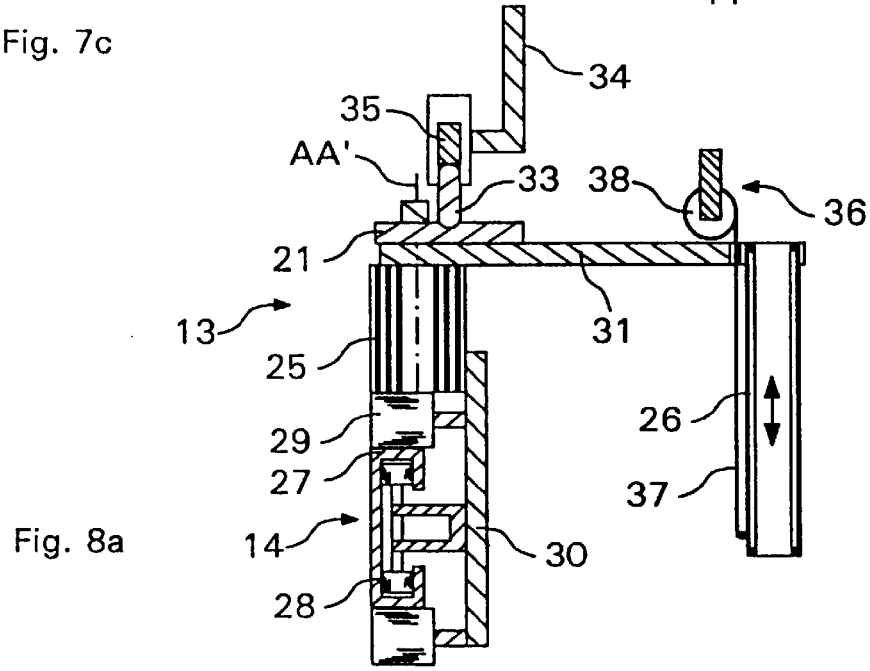

FIGS. 8a to 8c show sectional end elevation and plan views of a preferred embodiment of a movement barrier 13 and a movement barrier belt 14. The movement barrier belt 14 according to FIG. 8a is advantageously in the form of a C-guide rail 27, within which runs a driving chain drive with several running wheels 28. Above and below C-guide rail 27 there are fitted several stabilizer rolls 29 of barrier 13, which absorb any loads during the operation of the mechanism (e.g. impacts with animals). These stabilizer rolls 29 are, e.g., four rigid rubber wheels (in the view according to FIG. 8a there are visible only two stabilizer rolls 29).

Wheels 28 running on the C-guide rail 27 and stabilizer rolls 29 outside rail 27 are interconnected by a horizontal plate 30. To the horizontal plate 30 is fitted a torsion spring 25, located in a casing, which is pretensioned with an adjustable force and in the inoperative position (not latched into a conveying channel) presses barrier 13 against rail 27. By means of torsion spring 25, a barrier clip or member 31, as well as a vertical part 26 pretensioned against the latter by means of a spring, are connected to horizontal plate 30. The barrier member in animal-specific manner is 20 to 25 cm long and, with the barrier 13 latched-in (working position), projects with vertical part 26 into the conveying channel and blocks the latter (cf. FIGS. 3 and 4).

FIGS. 8b and 8c show how movement barrier 13 is latched into the conveying channel by moving an unlocking lever 32 up to an unlocking cam 21. The unlocking of the pretensioned barrier 13 advantageously takes place from the outside. Unlocking lever 32 is fitted in fixed manner at a latching point of the conveyor and can be moved about an unlocking distance of e.g. 1 to 5 cm (indicated by the double arrow) in the trajectory of the unlocking cam 21 of the barrier 13 in the inoperative position. Such unlocking levers can be fitted at selected positions of the conveyor and operate barriers 13 there. The unlocking cam 21 is rigidly connected to the casing of the torsion spring 25 and barrier member 31 of the barrier 13. These movements about an unlocking distance can be brought about automatically, e.g. by moving backwards and forwards by means of a stepping motor or sliding a cylinder. After advancing unlocking lever 32 according to FIG. 8b, its front end 32.1 is in the trajectory of unlocking cam 21, so that they come into contact, unlocking lever 32 exerts in slip-free manner a force on the curved lateral face of unlocking cam 21 and rotates the rigidly connected barrier member 31 about a rotation axis of barrier 13 designated AA'. The barrier member latched-in approximately in the conveying direction in the inoperative position is consequently unlatched in the working position (FIG. 8c). Unlocking lever 32 exerts in slip-free manner a force on unlocking cam 21, for as long as it engages on the curved lateral face, the unlocking lever 32 exerting no force as soon as it reaches the straight lateral face of the unlocking cam 21. Such cam drives are known and numerous implementation possibilities are available to the expert with the knowledge of the invention.

So as not to jam an animal during latching-in in the working position, as a safety mechanism the unlocking lever 32 is mounted in freely determinable and pretensioned manner, so that in the event of excessive force expenditure, i.e. an excessive torque, lever 32 is disengaged and the latching process is postponed. The barrier 13 to be latched is not unlatched.

As a further safety mechanism, movement barrier 13 is provided with a latch pin 33, which engages in a depression of unlocking cam 21 and which is freely determinably pretensioned as, by a pretensioner 35 (e.g. a wedge). If an overload now occurs in the working position (latched barrier 13), i.e. if external forces occur which are higher than the set overload, then latch pin 33 is disengaged from the depression and returns barrier 13, driven by the pretension of the torsion spring 25, back into the inoperative position on rail 27 (barrier 13 is then unlatched).

The unlatching of latch pin 33 can be initiated by an obstacle, against which the barrier 13 strikes during conveying or can be triggered by an alarmed animal, which strikes against barrier 13.

The unlatching of the latch pin 33 can also be brought about directly from the outside by means of an unlatching device 34 and can take place in controlled manner at random points. In analogy to the latching-in from the inoperative position by means of unlocking lever 32, unlatching of movement barrier 13 from the working position is now brought about by means of a unlatching lever, not shown, which is moved against unlatching means 34.

As a further safety mechanism the vertical part 26 is pretensioned in its lower position, so that independently of the latching in and out of movement barrier 13, it can be relaxed by means of an externally, actively or passively operable latching and unlatching device 36 and can be unlatched from the conveying channel and also pretensioned and latched. A contactless initiation by radio on a motor-driven latching and unlatching device 36 is also possible, but is not cost-effective. Vertical part 26 is e.g. pretensioned by means of a spring, so that with barrier 13 latched so as to have a blocking action for animals, it projects into the e.g. 45 cm wide conveying channel and is tensioned 1 to 5 cm above the conveyor belt (the latching and unlatching of the vertical parts 26 also takes place when the barriers 13 are latched in the inoperative position. The latching and unlatching device 36 is e.g. a spring-pretension drum 38, which by means of a cable line 37 raises (unlatches) the pretensioned vertical part 26 out of the conveying channel and, after passing an obstacle, lowers (latches) it back into that channel. Such an unlatching of vertical part 26 can e.g. take place when passing over connecting belts according to FIG. 3, so that a vertical part 26 of a movement barrier 13 is unlatched by the fixed, externally acting unlatching and latching device 36 (not shown in FIG. 3) with respect to the conveying channel, while the barrier 13 is itself still latched. The not shown, externally operable mans for operating the latching and unlatching device 36 can in the same way as the unlocking levers for the barriers and the unlatching levers for the latch pins, be fitted and automatically operated at freely determinable positions alongside dosing belts. Thus, the means can be designed flexibly with latchable and unlatchable movement barriers 13 and with largely independently latchable and unlatchable vertical parts 26.

Figure 9B:
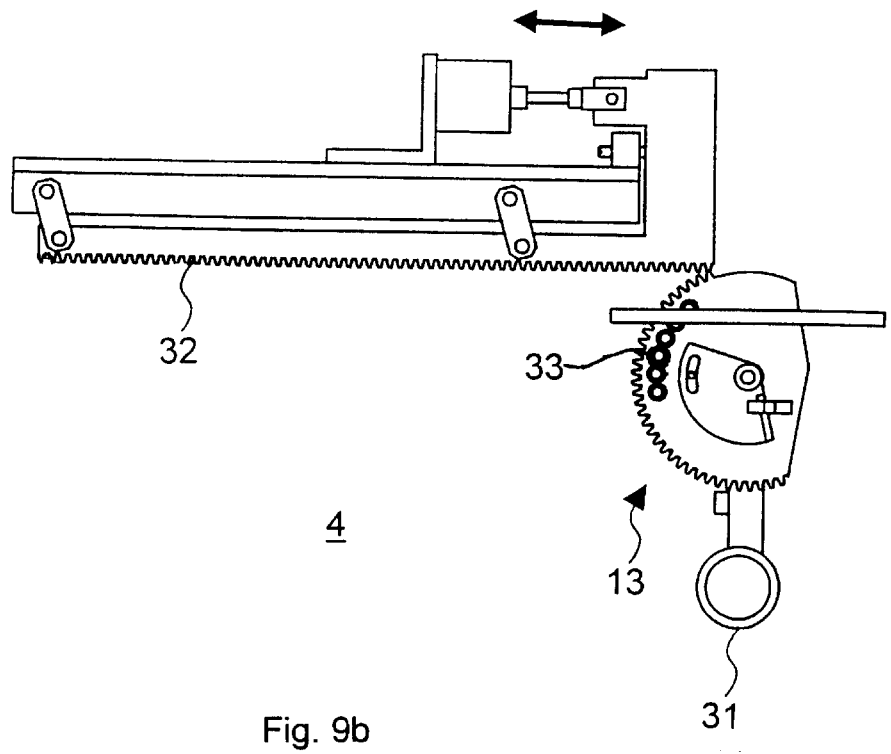
FIGS. 9a and 9b are side elevations of another preferred embodiment of a movement barrier.
Figure 9A:
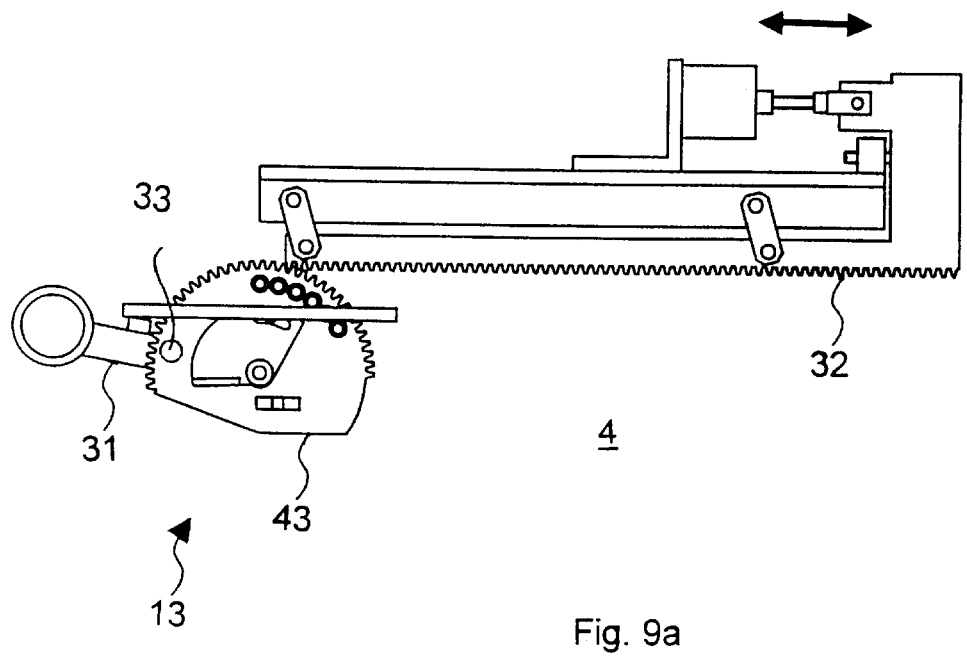

FIGS. 9a and 9b show diagrammatically in side views part of another preferred embodiment of a movement barrier 13, e.g. to be used in conjunction with a movement barrier belt according to FIG. 8a. The further, preferred embodiment of a barrier 13 according to FIGS. 9a and 9b has the same fundamental features as the barrier according to FIGS. 8a to 8c, so that reference is made to the description thereof and reference will only be made hereinafter to the differences.

As the main difference, the cam stop of the barrier according to FIGS. 8a to 8c is replaced by a toothed segment 43 of barrier 13. Toothed segment 43 and barrier member 31 are rigidly interconnected, so that by operating segment 43 the member 31 can be locked and unlocked. For example, a pneumatically operable cylinder drive 40 drives a piston (indicated by a double arrow), which can move forwards and backwards by a certain unlocking distance. During forward and backward movement, the piston operates an unlocking lever 32, which by means of guide mens in a forcibly controlled manner acts on toothed segment 43 of movement barrier 13, so that segment 43 can roll on lever 32. During the return movement, with unlocking lever 32 retracted, barrier 13 is in the inoperative position, and barrier member 31 is unlocked from the conveying channel (cf. FIG. 9a). Following the advance by an unlocking distance with unlocking lever 32 moved forwards, barrier member 31 of barrier 13 is latched in a working position in the conveying channel (cf. FIG. 9b).

So as not to jam an animal during this latching in the working position, as a safety mechanism, the force action of the pneumatic cylinder is freely adjustable, so that unlocking lever 32 cannot be advanced when excessive force is exerted on movement barrier member 31 and can be forced back as a function of a counterforce, so that no latching process takes place.

As a further safety mechanism, movement barrier 13 is provided with a latch pin 33. Latch pin 33 can be pretensioned in a freely determinable manner, e.g., by means of a wedge-shaped pretensioner 35 according to FIG. 8a or by means of spring or latch-like pretensioners, and presses on toothed segment 43, latch pin 33 with the barrier 13 latched-in, e.g., locking in an opening (cf. FIG. 9b). In the case of an overload in the working position and with excessive torque on barrier member 31, latch pin 33 is pressed against the pretension and is consequently disconnected from toothed segment 43, e.g. latch pin 33 then being disengaged from the opening and then barrier 13 can be unlatched in the inoperative position.

I claim:

1. A method for conveying a sequence of individual live animals comprising the steps of
providing a conveying channel having a dosing belt moving in a desired conveying direction and side walls extending along the dosing belt separated by a predetermined distance,
at a loading station, loading standing animals onto the belt in a column with the head of each animal oriented in a desired direction relative to the conveying direction and with separation between the animals,
inserting separating barriers transversely across the dosing belt separating individual animals from each other and moving the separating barriers with the dosing belt carrying the animals to maintain separation between the animals, and
conveying the animals in the channel to a destination station.

2. A method according to claim 1 and further comprising
providing an intermediate station between the loading station and the destination station, the intermediate station having a chest belt conveyor sloping upwardly to a level above the dosing belt substantially equal in height to a chest height of the animals being conveyed, and
transferring the animals to the chest belt by removing the dosing belt from beneath the animals.

3. A method according to claim 2 wherein the loading station includes a plurality of pens and openable access means for controlling entry of the animals onto the dosing belt, the step of loading including selectively opening the access means and guiding animals onto the dosing belt with desired separation between animals along the belt.

4. A method according to claim 1 wherein the dosing belt is substantially as wide as said predetermined distance, and further including, progressing along the conveying channel,
superimposing on the dosing belt two parallel foot belts carrying the feet of the animals,
removing the dosing belt so that the animals are supported on the foot belts,
at a transfer point, moving a chest belt up to the animal's chest while the animal is still standing, and
guiding the foot belts downwardly away from the chest belt so that the animals are supported on the chest belt.

5. A method according to claim 1 wherein the dosing belt is substantially equal to said predetermined width and further including the following steps progressing along the conveying channel,
superimposing on the dosing belt two parallel foot belts carrying the feet of the animals,
removing the dosing belt so that the animals are supported on the foot belts with the foot belts supported on a floor,
moving a chest belt up to the animal's chest while the animal is still standing, and
at a transfer point, passing the foot belts over a yielding floor region wherein the floor moves downwardly away from the chest belt so that the animals are supported on the chest belt.

6. A method according to claim 1 wherein the loading station includes a plurality of pens and openable access means for controlling entry of the animals onto the dosing belt, and the step of loading includes selectively opening the access means and guiding animals onto the dosing belt with desired separation between animals along the belt.

7. A method according to claim 1 wherein the conveying channel includes a branching device having a plurality of dosing belts having junctions for separating or combining columns of animals, the method including
automatically determining locations of animals on the dosing belts, and
as animals approach a junction, guiding the animals along desired paths between dosing belts by sliding movable barriers to block or unblock passages on the belts.

8. A method according to claim 1 wherein the conveying channel includes turning means for changing the orientation of an animal being conveyed on a dosing belt by 180°, the turning means including a turning belt moving laterally relative to the dosing belt, a turning space and a plurality of movable barriers, the method comprising
synchronously moving a barrier to block movement of the animal along the dosing belt and with a second barrier applying pulses suited to the animal against side and rear portions of the animal, thereby moving the animal from the dosing belt onto the turning belt and space,
with the turning belt, moving the front legs of the animal toward the dosing belt while applying pulses against rear and side portions of the animal with barriers, and
moving the barriers to form a channel over the dosing belt while removing the barrier blocking animal movement along the dosing belt to permit such movement in the new orientation.

9. A method according to claim 1 and including a
turning location for reversing the orientation of an animal on the dosing belt, and includes, before initiating turning of an animal,
automatically determining the position of an animal to be turned, and
automatically initiating a turning process as soon as an animal to be turned is adjacent the turning device,
wherein the barriers include first and second swinging walls and a rotatable wall, and the turning process includes
opening a first swinging wall and rotating the rotatable wall,
opening the second swinging wall and guiding the animal into the turning space with lateral and rear pulses whereby the animal's front legs enter onto a laterally moving conveyor belt and are turned toward the dosing belt, retracting the second swinging wall and returning the rotary wall to its initial position, guiding the animal into the conveying channel with pulses from the side or rear, and closing the first wall.

10. A method according to claim 1 including supporting the separating barriers on belts movable in the conveying direction so that the separating barriers move with the dosing belt, providing latches against movement of the separating barriers, pretensioning the movement barrier latches whereby the barriers are held in an inactive position in which the barriers are out of the conveying channel and are movable into an operative position in which the barriers protrude across the conveying channel and separate animals from each other, and mounting externally operated unlatching and latching devices at selected locations along the conveying channel.

\* \* \* \* \*